United States Patent Office 3,029,214
Patented Apr. 10, 1962

3,029,214
STABILIZED SOLUTIONS OF ACRYLONITRILE POLYMERS
Patrick H. Hobson, Decatur, Ala., assignor to The Chemstrand Corporation, Decatur, Ala., a corporation of Delaware
No Drawing. Filed May 23, 1958, Ser. No. 737,195
11 Claims. (Cl. 260—32.6)

This invention relates to stabilization of acrylonitrile polymer compositions, and more particularly it relates to solutions of acrylonitrile polymers which have improved resistance to the formation of color upon standing or the application of heat.

This application is a continuation-in-part of the copending application of Patrick H. Hobson, Serial Number 501,195, filed April 13, 1955, now abandoned.

In the production of shaped articles such as fibers, filaments, etc., from polymers of acrylonitrile, it is usually necessary to dissolve the polymers in a suitable organic solvent by means of heat, and to maintain such solutions at elevated temperatures for prolonged periods of time during the spinning operation such as, for example, extruding such heated solutions into either heated air or hot liquid coagulating baths. During these and other operations involving the heating of acrylonitrile solutions, the color of the spinning solutions undergoes a progressive darkening which affects the color of the articles produced. This objectionable darkening has occurred with all known organic solvents for acrylonitrile polymers. The development of color upon heating has been particularly objectionable with some of the most useful solvents, dimethyl carbamyl compounds such as dimethylformamide, dimethylacetamide, etc. The exact causes of the undesirable color of acrylonitrile polymer solutions have not been determined with certainty, but since some progressive darkening occurs with all known organic solvents it has been suggested that the causes are inherent in the polymers, at least to some degree. Whatever the correct explanation for this undesirable color formation may be, it has remained a problem of the first magnitude in the synthetic textile industry.

It is, therefore, an object of the present invention to substantially minimize the formation of undesirable color in acrylonitrile polymer compositions. Another object relates to color diminution in acrylonitrile polymer compositions which develop color with the passage of time, particularly when solutions of the polymers are permitted to stand for a prolonged period of time or at elevated temperatures. Still another object is to provide solutions of acrylonitrile polymers and articles produced therefrom having improved color characteristics. Other objects will be apparent from the following description of the invention.

It has now been found that the objects of this invention can be accomplished by dissolving acrylonitrile polymers in organic solvents for such polymers in the presence of a compound selected from the group consisting of phenol, hydroquinone, 2,5-di-tert-butylhydroquinone, and 2,5-di-tert-amylhydroquinone. The stabilizing agents permit prolonged standing of the solutions or exposure to high temperatures for considerable periods of time without the development of a high degree of objectionable color normally incident to the solutions of the said polymers in organic solvents.

It is preferred that the stabilizing agents of the present invention be present in a small amount compared with the amount of polymer dissolved. Thus, although the amount is not critical, it is preferred that each of the additives be present in the amount of about 0.01 percent to 2.0 percent based on the total weight of the polymer solution. The preferred method of practicing this invention involves the addition of the stabilizing agents to the polymer solvent prior to adding the polymer since in this manner any color that might be developed, as by heating, will be removed at the moment of its formation. However, the stabilizing compounds may be added during or after the dissolution of the polymer in the solvent. The compositions of the instant invention may be prepared over a varied range of temperatures. The polymers, a suitable solvent, and the stabilizing agents may be mixed at any temperature and the mixture heated, if necessary to dissolve the polymer, to any temperature up to the boiling point of the mixture.

The development of undesirable color in solutions of acrylonitrile polymers is suppressed in all known organic solvents for such polymers by the stabilizers of the instant invention. These include the dimethyl carbamyl compounds, such as N,N-dimethylformamide and N,N-dimethylacetamide, ethylene carbonate, gamma butyrolactone, nitromethane, sulfolane, the ortho-, meta-, and para-phenylenediamines, malononitrile, acetonitrile, the tris-dialkylaminophosphine oxides, such as tris-dimethylaminophosphine oxide, the N,N-tetramethylalkanephosphonamides, and tetrakis (N,N-dimethylamido) pyrophosphate. This invention has been found particularly useful in suppressing undesired color formation in solutions of acrylonitrile polymers in the dimethyl carbamyl solvents, N,N-dimethylformamide and N,N-dimethylacetamide, and accordingly, these are the solvents preferred in the practice of the invention.

Use of the stabilizing agents of this invention effects improvement in color characteristics in all solutions, and articles produced therefrom, of acrylonitrile polymers including not only polyacrylonitrile, but also acrylonitrile copolymers and interpolymers, particularly those containing at least 80 percent by weight of acrylonitrile in the polymer molecule, as well as blends of such acrylonitrile polymers with readily dyeable basic copolymers, such as copolymers containing at least 30 percent of a vinylpyridine or vinylimidazole and up to 70 percent of another mono-olefinic monomer copolymerizable therewith, particularly those having an overall polymerized acrylonitrile content of at least 80 percent. These blends may have as the principal polymer from 50 to 98 percent of a polymer of 80 or more percent acrylonitrile and minor proportions of other mono-olefinic monomers copolymerizable therewith and from 2 to 50 percent of a blending polymer of at least 30 percent of a vinyl N-heterocyclic monomer and up to 70 percent of another mono-olefinic monomer copolymerizable therewith, the two polymers being so proportioned as to provide from two to ten percent of the vinyl N-heterocyclic monomer in polymerized form in the blend. The preferred N-heterocyclic monomers are the vinylpyridines, alkyl-substituted vinylpyridines, 1-vinylimidazole, and alkyl-substituted 1-vinylimidazoles, such as 2-vinylpyridine, 4-vinylpyridine, 2-methyl-5-vinylpyridine, 1-vinylimidazole, and 2-, 4-, or 5-methyl-1-vinylimidazole.

Among the mono-olefinic monomers useful for copolymerization with acrylonitrile to form copolymers and interpolymers there may be mentioned vinyl acetate and other vinyl esters of monocarboxylic acids having up to four carbon atoms, methyl acrylate and other alkyl acrylates having up to four carbon atoms in the alkyl radical, methyl methacrylate and other alkyl methacrylates having up to four carbon atoms in the alkyl radical, acrylic, alpha-chloroacrylic, and methacrylic acids, vinyl chloroacetate and other vinyl esters of the halogen-substituted monocarboxylic acids, dialkyl fumarates, maleates, and crotonates having up to four carbon atoms in the alkyl radicals, styrene, alpha-methylstyrene, and other vinyl or alkenyl-substituted aromatic hydrocarbons, vinyl chloride, vinylidene chloride, and other vinyl or vinylidene halides, methacrylonitrile, methyl vinyl ketone, N-vinylcarbazole, vinyl furane, and vinyl-substituted N-heterocyclic tertiary amines, such as the vinylpyridines and alkyl-substituted vinylpyridines, 1-vinylimidazole and alkyl-substituted 1-vinylimidazoles. Any of the above-named mono-olefinic monomers are likewise useful for copolymerization with acrylonitrile to form the principal polymer of the above-described blends.

Among the mono-olefinic monomers useful for copolymerization with the vinyl N-heterocyclic monomers to form the blending polymers are styrene, alpha-methylstyrene, vinyl naphthalene, vinyl chloride, vinylidene chloride, vinyl acetate and other vinyl carboxylates, acrylonitrile, methacrylonitrile, acrylic and methacrylic acids, the alkyl acrylates, alkyl methacrylates, alkyl crotonates, alkyl fumarates, alkyl maleates, and vinyl ethers. Since the copolymers of the vinyl N-heterocyclic monomers with acrylonitrile have good thermal stability and solvent resistance, these copolymers are usually preferred as the blending polymers.

While the preferred polymers useful in the instant invention are those containing at least 80 percent acrylonitrile, generally recognized as the fiber-forming acrylonitrile polymers, it will be understood that the invention is likewise applicable to polymers containing less than 80 percent acrylonitrile and the same stability of color is realized with the stabilizing agents of this invention. Acrylonitrile polymers containing less than 80 percent acrylonitrile are useful in forming films, coating compositions, moldings, lacquers, etc. in all of which applications freedom from undesirable color is extremely important.

The invention is further illustrated by reference to the following specific examples in which parts, proportions, and percentages are by weight, unless otherwise stated.

EXAMPLE I

There was dissolved one gram of polymeric acrylonitrile in 20 mls. of N,N-dimethylacetamide at 80° C. and the solution maintained at this temperature for 6 hours. Thereafter the solution was cooled and the presence of developed color determined. A series of solutions was prepared and heated in exactly the same manner, except that the dimethylacetamide solvent contained 1.0 percent based on the total weight of the solution of the color inhibiting agents listed in Table I below.

The degree of color developed by the solutions during heating was determined on a General Electric recording spectrophotometer as tristimulus values which are reported in Table I below in Judd Units darker than a sample of the dimethylacetamide solvent alone determined according to the method of Nickerson as set forth in "Tables for Use in Computing Small Color Differences," American Dyestuff Reporter, vol. 39, pages 541 to 546.

*Table I*

5 PERCENT POLYACRYLONITRILE SOLUTIONS IN N,N-DIMETHYLACETAMIDE

| Color inhibiting agent: | Judd units (darker than solvent) |
|---|---|
| None | 28.6 |
| 1.0% phenol | 15.5 |
| 1.0% hydroquinone | 7.9 |

EXAMPLE II

There were prepared a series of solutions of one gram of a copolymer containing 94 percent acrylonitrile and six percent vinyl acetate in 20 mls. of N,N-dimethylacetamide at 80° C. One solution was maintained as a control and in the others the dimethylacetamide contained in solution 1.0 percent based on the total weight of the solution of the color inhibiting agents listed in Table II below. The polymer solutions were held at the temperature of 80° C. for six hours, then cooled and the presence of developed color determined as in Example I. The results are recorded in Table II in Judd Units darker than a sample of the dimethylacetamide solvent alone, determined as in Example I.

*Table II*

5 PERCENT ACRYLONITRILE COPOLYMER SOLUTIONS IN N,N-DIMETHYLACETAMIDE

| Color inhibiting agent: | Judd units (darker than solvent) |
|---|---|
| None | 32.0 |
| 1.0% phenol | 23.4 |
| 1.0% hydroquinone | 21.2 |

EXAMPLE III

There were prepared a series of solutions of one gram of a blend of 88 percent of a copolymer containing 94 percent acrylonitrile and six percent vinyl acetate with 12 percent of a second polymer containing 50 percent 2-methyl-5-vinylpyridine and 50 percent acrylonitrile in 20 mls. of N,N-dimethylacetamide at 80° C. One solution was maintained as a control, while in the others the dimethylacetamide solvent contained in solution 0.1 percent based on the total weight of the solutions of the various color inhibiting agents listed in Table III below. The polymer solutions were held at 80° C. for six hours, then cooled and the presence of developed color determined as in Example I. The results are recorded in Table III in Judd Units darker than a sample of the N,N-dimethylacetamide solvent alone, determined as in Example I.

*Table III*

5 PERCENT ACRYLONITRILE BLEND POLYMER SOLUTIONS IN N,N-DIMETHYLACETAMIDE

| Color inhibiting agent: | Judd units (darker than solvent) |
|---|---|
| None | 29.0 |
| 0.1% hydroquinone | 20.6 |
| 0.1% 2,5-di-tert-butylhydroquinone | 19.6 |
| 0.1% 2,5-di-tert-amylhydroquinone | 18.2 |

EXAMPLE IV

There were prepared a series of three solutions by dissolving the same blend of copolymers set forth in Example III above in N,N-dimethylacetamide at 80° C. to the amount of 5 percent polymer by weight. One solution was maintained as a control, while to the other there was added the percentage by weight of hydroquinone listed in Table IV below. The polymer solutions were held at 80° C. for six hours, then cooled and the presence of developed color determined as in Example I. The results are recorded in Table IV in Judd Units darker than a sample of the N,N-dimethylacetamide solvent alone.

*Table IV*

5 PERCENT ACRYLONITRILE BLEND POLYMER SOLUTIONS IN N,N-DIMETHYLACETAMIDE

| Color inhibiting agent: | Judd units (darker than solvent) |
|---|---|
| None | 19.1 |
| 0.025% hydroquinone | 11.4 |
| 1.85% hydroquinone | 11.5 |

There are many advantages presented by the composition of the instant invention. By this invention it is possible to prepare solutions of acrylonitrile polymers in conventional solvents which are free of color. Such solutions may be allowed to stand for extended periods and remain free of color. Heat may be applied to such solutions without danger of color formation. The freedom from color of the polymer solutions results in products produced from such solutions which are likewise free of undesirable color and therefore of greater value. For example, fibers spun from such polymer solutions are free of objectionable color, and in turn can be dyed to brighter shades and lighter pastels, which are desirable for use in the textile field. The stabilizing agents are readily available and inexpensive. Furthermore, the compositions can be readily prepared with no necessity of extensive changes required in the process or apparatus for their preparation.

As many variations within the spirit and scope of this invention will occur to those skilled in the art, it is to be understood that the invention is not limited to the specific embodiments thereof except as set forth in the appended claims.

I claim:

1. A new composition of matter consisting of an acrylonitrile polymer selected from the group consisting of a polymer of at least 80 percent by weight acrylonitrile, up to 18 percent of at least one other mono-olefinic monomer copolymerizable therewith, and from 2 to 10 percent by weight of a vinyl N-heterocyclic monomer and a blend of (A) a polymer of at least 80 percent by weight acrylonitrile and up to 20 percent by weight of another monoolefinic monomer copolymerizable therewith and (B) a polymer of at least 30 percent by weight of a vinyl N-heterocyclic monomer and up to 70 percent by weight of another mono-olefinic monomer copolymerizable therewith, (A) and (B) being so proportioned that the said blend contains from 2 to 10 percent of the said vinyl N-heterocyclic monomer based on the weight of the blend, an organic solvent therefor, and as a color stabilizer therefor a compound selected from a group consisting of phenol, hydroquinone, 2,5-di-tert-butylhydroquinone, and 2,5-di-tert-amylhydroquinone.

2. A new composition of matter consisting of an acrylonitrile polymer selected from the group consisting of a polymer of at least 80 percent by weight acrylonitrile, up to 18 percent by weight of at least one other mono-olefinic monomer copolymerizable therewith, and from 2 to 10 percent by weight of a vinyl N-heterocyclic monomer and a blend of (A) a polymer of at least 80 percent by weight acrylonitrile and up to 20 percent by weight of another mono-olefinic monomer copolymerizable therewith and (B) a polymer of at least 30 percent by weight of a vinyl N-heterocyclic monomer and up to 70 percent by weight of another mono-olefinic monomer copolymerizable therewith, (A) and (B) being so proportioned that the said blend contains from 2 to 10 percent of the said vinyl N-heterocyclic monomer based on the weight of the said blend, an organic solvent therefor, and from 0.01 to 2.0 percent based on the total weight of the solvent and polymer of a compound selected from the group consisting of phenol, hydroquinone, 2,5-di-tert-butylhydroquinone and 2,5-di-tert-amylhydroquinone.

3. A new composition of matter consisting of an acrylonitrile polymer selected from the group consisting of a polymer of at least 80 percent by weight of acrylonitrile, up to 18 percent by weight of at least one other mono-olefinic monomer copolymerizable therewith, and from 2 to 10 percent by weight of a vinyl N-heterocyclic monomer and a blend of (A) a polymer of at least 80 percent by weight acrylonitrile and up to 20 percent by weight of another mono-olefinic monomer copolymerizable therewith and (B) a polymer of at least 30 percent by weight of a vinyl N-heterocyclic monomer and up to 70 percent by weight of another mono-olefinic monomer copolymerizable therewith, (A) and (B) being so proportioned that the said blend contains from 2 to 10 percent of the said vinyl N-heterocyclic monomer based on the weight of the said blend, a dimethyl carbamyl solvent therefor, and from 0.01 to 2.0 percent based on the total weight of solvent and polymer of a compound selected from the group consisting of phenol, hydroquinone, 2,5-di-tert-butylhydroquinone and 2,5-di-tert-amylhydroquinone.

4. The composition of matter as defined in claim 2 wherein the acrylonitrile polymer is a polymer of at least 80 percent by weight acrylonitrile, up to 18 percent by weight of at least one other mono-olefinic monomer copolymerizable therewith, and from 2 to 10 percent by weight of a vinyl N-heterocyclic monomer.

5. A new composition of matter consisting of a polymer of at least 80 percent by weight acrylonitrile, up to 18 percent by weight of at least one other mono-olefinic monomer copolymerizable therewith, and from 2 to 10 percent by weight of a vinyl N-heterocyclic monomer, a dimethyl carbamyl solvent therefor, and from a 0.01 to 2.0 percent based on the total weight of the solvent and polymer of a compound selected from the group consisting of phenol, hyroquinone, 2,5-di-tert-butylhydroquinone, and 2,5-di-tert-amylhydroquinone.

6. The composition of matter as defined in claim 2 wherein the acrylonitrile polymer is a blend of (A) a polymer of at least 80 percent by weight acrylonitrile and up to 20 percent by weight of another mono-olefinic monomer copolymerizable therewith and (B) a polymer of at least 30 percent by weight of a vinyl N-heterocyclic monomer and up to 70 percent of another mono-olefinic monomer copolymerizable therewith, (A) and (B) being so proportioned that the said blend contains from two to ten percent of the said vinyl N-heterocyclic monomer based on the weight of the blend.

7. The new composition of matter as defined in claim 2 wherein the compound is phenol.

8. The new composition of matter as defined in claim 2 wherein the compound is hydroquinone.

9. The new composition of matter as defined in claim 2 wherein the compound is 2,5-di-tert-butylhydroquinone.

10. The new composition of matter as defined in claim 2 wherein the compound is 2,5-di-tert-amylhydroquinone.

11. A new composition of matter consisting of a blend of (A) a polymer of at least 80 percent by weight acrylonitrile and up to 20 percent by weight of vinyl acetate, and (B) a polymer of at least 30 percent by weight of a vinylpyridine and up to 70 percent by weight of acrylonitrile, (A) and (B) being so proportioned that the said blend contains from two to ten percent of the said vinylpyridine based on the weight of the blend, a dimethyl carbamyl solvent therefor, and from 0.01 to 2.0 percent based on the total weight of the solvent and polymer of a compound selected from the group consisting of phenol, hydroquinone, 2,5-di-tert-butylhydroquinone, and 2,5-di-tert-amylhydroquinone.

References Cited in the file of this patent

UNITED STATES PATENTS

| | | |
|---|---|---|
| 2,688,008 | Chaney et al. | Aug. 31, 1954 |
| 2,706,185 | Kowolik et al. | Apr. 12, 1955 |
| 2,804,444 | Segro et al. | Aug. 27, 1957 |
| 2,878,205 | Holmes et al. | Mar. 17, 1959 |